(12) United States Patent
Wiencek

(10) Patent No.: US 9,073,550 B2
(45) Date of Patent: Jul. 7, 2015

(54) METHOD FOR OPERATING A DRIVE TRAIN

(75) Inventor: Norbert Wiencek, Hagnau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 843 days.

(21) Appl. No.: 13/382,568

(22) PCT Filed: Jul. 2, 2010

(86) PCT No.: PCT/EP2010/059439
§ 371 (c)(1),
(2), (4) Date: Jan. 6, 2012

(87) PCT Pub. No.: WO2011/003824
PCT Pub. Date: Jan. 13, 2011

(65) Prior Publication Data
US 2012/0109476 A1      May 3, 2012

(30) Foreign Application Priority Data

Jul. 9, 2009     (DE) .......................... 10 2009 027 564

(51) Int. Cl.
| | |
|---|---|
| *F16H 59/42* | (2006.01) |
| *F16H 61/14* | (2006.01) |
| *B60W 10/02* | (2006.01) |
| *B60W 30/18* | (2012.01) |
| *F16D 48/06* | (2006.01) |

(52) U.S. Cl.
CPC ......... B60W 30/18072 (2013.01); B60W 10/02 (2013.01); *B60W 2510/1015* (2013.01); *B60W 2710/022* (2013.01); F16D 48/06 (2013.01); *F16D 2500/30816* (2013.01); *F16D 2500/50825* (2013.01); *F16D 2500/5085* (2013.01); *F16D 2500/7041* (2013.01)

(58) Field of Classification Search
USPC .......................................................... 701/60
See application file for complete search history.

(56) References Cited

U.S. PATENT DOCUMENTS

| | | | | |
|---|---|---|---|---|
| 5,316,116 | A * | 5/1994 | Slicker et al. ................. | 477/181 |
| 5,495,912 | A * | 3/1996 | Gray et al. ..................... | 180/165 |
| 5,681,242 | A * | 10/1997 | Bates ............................. | 477/180 |
| 5,754,969 | A * | 5/1998 | Ando et al. ..................... | 701/67 |
| 5,810,141 | A * | 9/1998 | Organek et al. ................. | 192/35 |
| 5,910,061 | A * | 6/1999 | Organek et al. ............... | 475/149 |
| 5,947,857 | A * | 9/1999 | Organek et al. ............... | 475/149 |

(Continued)

FOREIGN PATENT DOCUMENTS

| | | | |
|---|---|---|---|
| DE | 101 16 544 C1 | 6/2002 | |
| DE | 10116544 C1 * | 6/2002 | ............. F16D 48/06 |

(Continued)

*Primary Examiner* — Shelley Chen

(74) *Attorney, Agent, or Firm* — Davis & Bujold, P.L.L.C.; Michael J. Bujold

(57) ABSTRACT

A method of operating a drive-train which comprises a drive aggregate, a transmission and a starting clutch connected between the drive aggregate and the transmission such that during rolling and coasting, in a thrust operation, the drive-train is operated in such manner that a target value for the position of the clutch is determined as a function of a transmission input speed. The target value for the position of the clutch is compared with a corresponding actual value and, on the basis of the deviation between the target and actual values, a control parameter is generated for adjusting the clutch. The target value for the position of the clutch, during rolling and coasting, is determined in such manner that for a defined value of the transmission input speed, a target value is determined for the position of the clutch when rolling which is different from that determined when coasting.

6 Claims, 2 Drawing Sheets

(56) References Cited

U.S. PATENT DOCUMENTS

| | | | |
|---|---|---|---|
| 6,019,699 A * | 2/2000 | Hoshiya et al. | 477/20 |
| 6,024,673 A * | 2/2000 | Hayashi et al. | 477/171 |
| 6,640,951 B2 | 11/2003 | Bamberger et al. | |
| 7,894,964 B2 * | 2/2011 | Murayama et al. | 701/54 |
| 7,935,024 B2 | 5/2011 | Winkel et al. | |
| 2002/0139635 A1 * | 10/2002 | Bamberger et al. | 192/103 R |
| 2003/0203790 A1 * | 10/2003 | Matsubara et al. | 477/107 |
| 2004/0138027 A1 * | 7/2004 | Rustige et al. | 477/175 |
| 2005/0071065 A1 | 3/2005 | Zimmermann et al. | |
| 2006/0240943 A1 * | 10/2006 | Winkel et al. | 477/70 |
| 2007/0010927 A1 * | 1/2007 | Rowley et al. | 701/51 |
| 2008/0058154 A1 * | 3/2008 | Ashizawa et al. | 477/5 |
| 2010/0151991 A1 * | 6/2010 | Mair et al. | 477/77 |
| 2010/0185372 A1 * | 7/2010 | Herter et al. | 701/67 |
| 2010/0292901 A1 * | 11/2010 | Ortmann et al. | 701/67 |

FOREIGN PATENT DOCUMENTS

| | | | | |
|---|---|---|---|---|
| DE | 102 30 612 A1 | | 2/2003 | |
| DE | 10230612 A1 * | | 2/2003 | B60K 41/00 |
| DE | 699 04 383 T2 | | 9/2003 | |
| DE | 103 34 930 A1 | | 2/2005 | |
| DE | 10334930 A1 * | | 2/2005 | F16H 59/36 |
| DE | 10 2006 001 468 A1 | | 8/2006 | |
| DE | 102006001468 | * | 8/2006 | |
| DE | 102006001468 A1 * | | 8/2006 | |
| DE | 10 2007 012 875 A1 | | 9/2008 | |
| DE | 102007012875 A1 * | | 9/2008 | F16H 61/02 |
| DE | 10 2007 030 490 A1 | | 1/2009 | |
| DE | 102007030490 A1 * | | 1/2009 | F16D 48/08 |
| EP | 0 601 729 A1 | | 6/1994 | |
| EP | 0 731 294 A2 | | 9/1996 | |

* cited by examiner

METHOD FOR OPERATING A DRIVE TRAIN

This application is a national stage completion of PCT/EP2010/059439 filed Jul. 2, 2010 which claims priority from German Application Serial No. 10 2009 027 564.9 filed Jul. 9, 2009.

FIELD OF THE INVENTION

The invention concerns a method for operating a drive-train.

BACKGROUND OF THE INVENTION

The main components of a drive-train are a drive aggregate and a transmission, the transmission being connected between the drive aggregate and a drive output of the drive-train. The transmission converts rotational speeds and torques and thereby transmits the traction force supplied by the drive aggregate and provides it at the output of the drive-train. The present invention concerns a method for operating a drive-train which, besides the drive aggregate, transmission and output already mentioned, also comprises a starting clutch connected between the drive aggregate and the transmission. The transmission of the drive-train is preferably in the form of an automatic or semi-automatic transmission, in particular an automatic or semi-automatic manual transmission.

From practice it is already known to operate a drive-train for rolling and coasting during thrust operation, in such manner that a target value for the position of the starting clutch connected between the drive aggregate and the transmission is determined as a function of a transmission input speed, then comparing the target value for the position of the starting clutch with a corresponding actual value, so that in a regulator, on the basis of the deviation between the target and the actual values, an adjustment parameter for adjusting the starting clutch is generated, namely in such manner that by virtue of the adjustment of the starting clutch, the actual value approaches the target value. Thrust operation of the drive-train is understood to mean movement, i.e. in this case rolling or coasting, during which an accelerator pedal or gas pedal of the drive-train is not actuated, or whose actuation is smaller than a specified limit value. During rolling or coasting a gear is engaged in the transmission.

In methods known from practice for operating a drive-train in the thrust mode during rolling or coasting, the target value for the position of the starting clutch is preferably determined from a characteristic curve, the same curve being used for rolling and for coasting, so that for a defined value of the transmission input speed in each case the same target value for the position of the starting clutch is determined both for rolling and for coasting. Owing to inertial effects in the control system of the starting clutch, in this case, for example when rolling downhill, the transmission input speed may exceed the speed of the drive aggregate until the starting clutch, which has to be closed farther, has accelerated the drive aggregate to the level of the transmission input speed. Because of this the drive-train becomes somewhat slower, so with decreasing transmission input speed the starting clutch can be opened more easily, in order to be closed again subsequently. In a drive-train prone to oscillations this can lead to resonance effects of the drive-train, since the transmission input speed influences the target value for the position of the starting clutch and is thus regeneratively coupled to the target value for the position of the starting clutch. Such upswings of a drive-train with oscillating movement of the starting clutch impairs the driving comfort and is therefore disadvantageous.

As already mentioned, in the methods known from practice the control parameter for adjusting the starting clutch is determined as a function of the deviation between the target value for the position of the starting clutch and the corresponding actual value, the control parameter typically being an adjustment speed for the starting clutch in its closing or opening direction. This too can result in uncomfortable driving behavior.

As prior art, the documents DE 103 34 930 A1 and DE 10 2007 012 875 A1 can be mentioned, each of which discloses a method for operating a drive-train in the thrust mode.

SUMMARY OF THE INVENTION

Starting from there, the purpose of the present invention is to provide a new type of method for operating a drive-train.

In a first aspect of the inventive method the target value for the position of the starting clutch when rolling and coasting is determined in such manner that with a defined value of the transmission input speed, a target value is determined for the position of the starting clutch during rolling, which is different from the value determined during coasting.

According to this first aspect of the invention, the target value for the position of the starting clutch when rolling and when coasting during thrust operation is determined such that at a given value of the transmission input speed, a different value is determined for rolling from the value determined for coasting. In this way oscillation movement of the starting clutch can be reliably avoided even in drive-trains prone to oscillation. According to the invention, in this way the target value for the position of the starting clutch is associated with a hysteresis, whereby the target value for the position of the starting clutch is made less sensitive to fluctuations of the transmission input speed. This increases the driving comfort.

In a second aspect of the inventive method the control parameter for adjusting the starting clutch is determined on the basis of the relative deviation between the target value for the position of the starting clutch and the actual value of the position of the starting clutch, and additionally on the basis of the absolute actual value of the position of the starting clutch.

According to this second aspect of the invention, the control parameter for adjusting the starting clutch is determined not only on the basis of the relative deviation between the target value for the position of the starting clutch and the corresponding actual value, but rather, additionally on the basis of the absolute actual value of the position of the starting clutch. This aspect of the present invention is based on the recognition that the driving comfort can be increased if, despite having the same relative deviation between the target and actual values of the position of the starting clutch, different control parameters for adjusting the starting clutch are determined as a function of the absolute actual value of the position of the starting clutch.

Preferably, the two aspects according to the invention are applied in combination with one another.

BRIEF DESCRIPTION OF THE DRAWINGS

Example embodiments of the invention, to which it is not limited, are explained in more detail with reference to the drawings, which show.

DETAILED DESCRIPTION OF THE DRAWINGS

Figure 1:
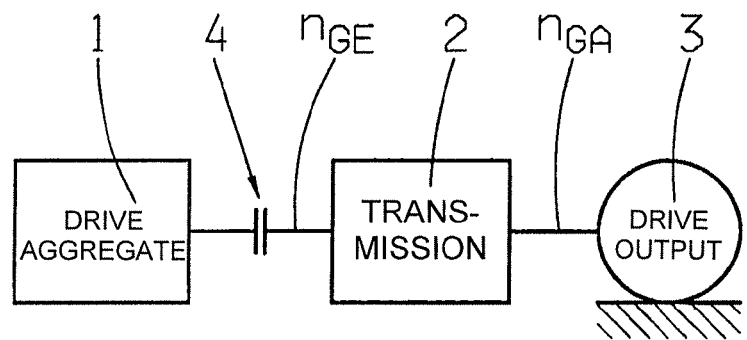
FIG. 1 A schematic representation of a drive-train in which the method according to the invention can be used.

The present invention relates to a method for operating a drive-train. FIG. 1 is a very schematic representation of a drive-train in which the method according to the invention can be used. Thus, the drive-train in FIG. 1 has a drive aggregate 1 and a transmission 2, the transmission 2 being connected between the drive aggregate 1 and a drive output 3 of the drive-train.

The transmission 2 serves to convert rotational speeds and torques so as to deliver the traction force provided by the drive aggregate 1 to the output 3. For the transmission 2 FIG. 1 shows a transmission input speed $n_{GE}$ and a transmission output speed $n_{GA}$. The transmission 2 is preferably an automatic or semi-automatic manual transmission.

Between the drive aggregate 1 and the transmission 2, as shown in FIG. 1, is connected a starting clutch 4 which is preferably a transmission-external starting clutch.

The present invention concerns only such details of a method for operating a drive-train, in which the drive-train is operated in the thrust mode when rolling or coasting. During rolling or coasting, a gear is engaged in the transmission 2.

Thrust operation is understood to mean a mode of operation in which, while driving, i.e. in this case while rolling or coasting, an accelerator or gas pedal is not actuated or its actuation is smaller than a specified limit value.

Rolling or coasting in thrust operation with a gear engaged in the transmission 2 can take place either with or without actuation of a brake pedal.

Figure 2:
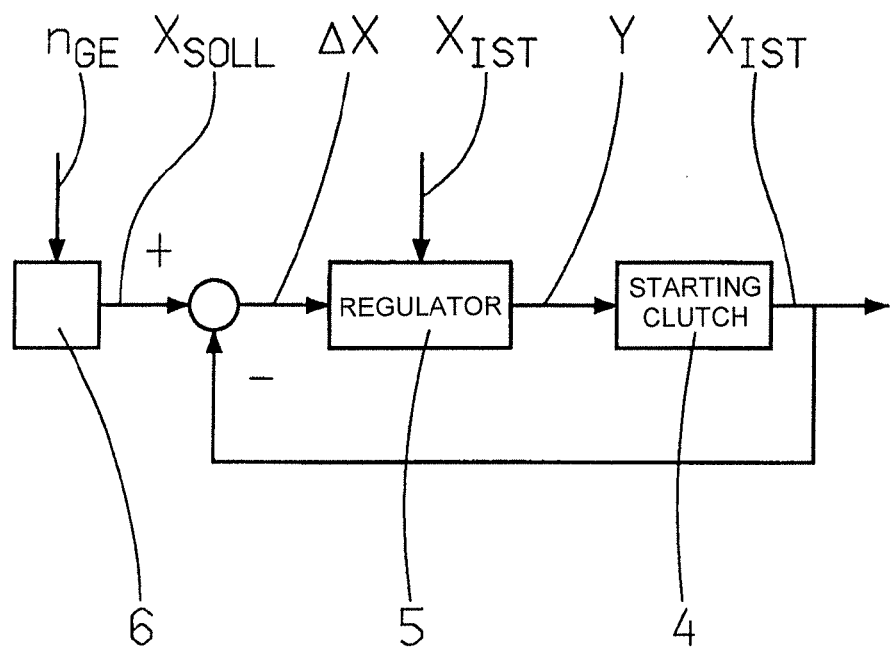
FIG. 2 A block diagram to make clear the method according to the invention.

When rolling or when coasting in thrust operation with a gear engaged in the transmission 2, as shown in the block diagram of FIG. 2 a control parameter Y for adjusting the starting clutch 4 is determined by a regulator 5 on the basis of a deviation $\Delta X$ between a (utilized) target value $X_{SOLL}$ for, and an actual value $X_{IST}$ of, the position of the starting clutch 4. The target value $X_{SOLL}$ for the position of the starting clutch 4 is supplied by a target value generating device 6.

According to a first aspect of the present invention, the target value $X_{SOLL}$ for the position of the starting clutch 4 is determined on the one hand for rolling and on the other hand for coasting, in such manner that with a given value of the transmission input speed $n_{GE}$, a target value for the position of the starting clutch 4 during rolling is determined, which is different from that determined during coasting.

Below, this is explained in detail with reference to the diagram shown in FIG. 3, in which the target value $X_{SOLL}$ for the position of the starting clutch 4 is plotted as a function of the transmission input speed $n_{GE}$. A target value $X_{SOLL}$ of 0% corresponds to a fully open starting clutch 4. A target value of 100% corresponds to a fully closed starting clutch 4.

Figure 3:
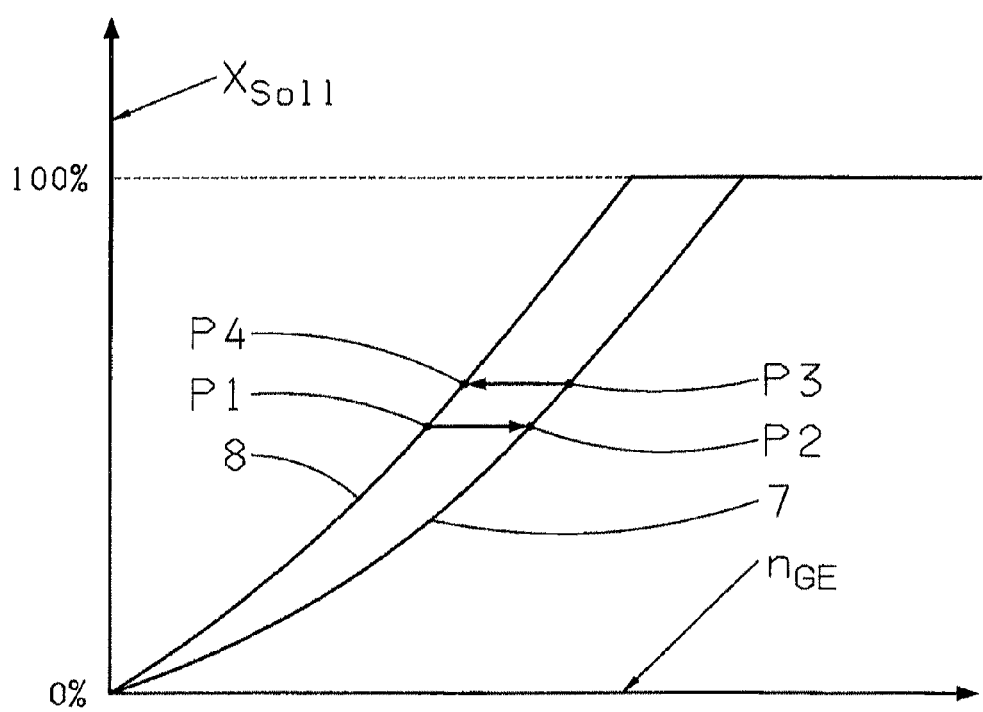
FIG. 3 A diagram for the further clarification of the method according to the invention.

As shown in FIG. 3, the target value $X_{SOLL}$ for the position of the starting clutch 4, on the one hand during rolling and on the other hand during coasting, is determined on the basis of separate characteristic or performance curves 7, 8. In the diagram of FIG. 3, for a specific gear in the transmission 2 two characteristic curves 7 and 8 are plotted, namely a first curve 7 which applies for rolling in thrust operation and accordingly for a starting clutch 4 to be closed farther, and a curve 8 which applies for coasting in thrust operation and thus for a starting clutch 4 to be opened farther.

From FIG. 3 it follows that with a given transmission input speed $n_{GE}$, on the basis of the curve 7 for rolling, a different target value $X_{SOLL}$ will be obtained than on the basis of the curve 8 for coasting, this being true for all transmission input speeds $n_{GE}$, namely between the transmission input speed for which, when rolling and coasting, a fully open starting clutch 4 ($X_{SOLL}$=0%) is required, and the transmission input speed for which, when rolling, a fully closed starting clutch 4 ($X_{SOLL}$=100%) is required.

As already mentioned, for every possible gear of the transmission 2 in which rolling and coasting in thrust operation can take place, at least two separate characteristic curves are stored, namely at least one curve for rolling and at least one curve for coasting.

Preferably, for each gear of the transmission there are two characteristic curves for rolling and two for coasting, namely on the one hand curves for rolling and coasting without the actuation of a brake pedal and on the other hand curves for rolling and coasting with actuation of the brake pedal.

Accordingly, it follows from the present invention that when a gear is engaged in the transmission 2 and the drive-train is operated in the thrust mode during rolling or coasting, the target position $X_{SOLL}$ for the starting clutch 4 is determined as a function of the transmission input speed $n_{GE}$, either from a first characteristic curve which is valid for rolling with increasing speed or increasing transmission input speed of the drive-train and thus a starting clutch 4 which is to be closed farther, or on the basis of a curve which is valid for coasting with decreasing speed or decreasing transmission input speed of the drive-train and thus a starting clutch 4 which is to be opened farther.

The characteristic curves are preferably stored in a transmission control unit of the transmission 2, and this in the form of support points, so that if a transmission input speed $n_{GF}$ falls between two support points, an interpolation is carried out between the target values $X_{SOLL}$ stored for the support points.

During rolling in thrust operation the (rolling) target position $X_{SOLL}$ for the starting clutch 4 with increasing transmission input speed or increasing speed of the drive-train is determined along the curve 7 in FIG. 3 in such manner that the starting clutch is closed farther. If now, during rolling, the situation arises that as the target value $X_{SOLL}$ for the starting clutch 4 is displaced along the curve 7, for example in the direction of the working point P3, the drive-train slows down, then the working point moves along an imaginary line from the working point P3 in the direction toward a working point P4, so that as the transmission input speed $n_{GE}$ decreases the target value $X_{SOLL}$ for the starting clutch 4 does not at first change. Only when the working point P4 has been reached and the transmission input speed $n_{GE}$ decreases farther, does the target value $X_{SOLL}$ for the starting clutch 4 change along the curve 8 in the direction toward a starting clutch 4 which is to be opened farther.

In an analogous manner, if during coasting in thrust operation, the (coasting) target value $X_{SOLL}$ for the starting clutch 4 first changes along the curve 8, for example starting from a fully closed clutch in the direction toward the working point P1 and, for example due to a steeply downhill stretch, the transmission input speed $n_{GE}$ increases again, the working point moves along an imaginary line to the right in the direction toward the working point P2, and then the target value $X_{SOLL}$ for the position of the starting clutch 4 does not change at first, but only when the working point P2 has actually been reached and the transmission input speed $n_{GE}$ increases farther. Only then does the target value $X_{SOLL}$ for the position of the starting clutch 4 increase again along the curve 7.

In contrast, if the transmission input speed $n_{GE}$ falls again before the working point P2 has been reached, then the target value $X_{SOLL}$ for the position of the starting clutch 4 does not change until, with the transmission input speed $n_{GE}$ falling, the speed has fallen below the value associated with the working point P1.

In the above manner, for the determination of the target value $X_{SOLL}$ for the position of the starting clutch 4, on the basis of the transmission input speed $n_{GE}$ a hysteresis is established so that the target value $X_{SOLL}$ for the position of the starting clutch 4 does not react to small speed fluctuations. Thereby, even in a drive-train that is prone to oscillations, an oscillating movement of the starting clutch 4 can be reliably avoided.

The shape of the characteristic curves, in particular the curves 7 and 8 in FIG. 3, can be straight or curved. As already mentioned, for every gear in the transmission a plurality of such curves are preferably stored in a transmission control unit.

With regard to the transmission input speed $n_{GE}$ on the basis of which the target value $X_{SOLL}$ for the position of the starting clutch 4 is determined, this can be either a transmission input speed determined by measurement or a calculated transmission input speed, the calculated transmission input speed being determined from a measured transmission output speed and the gear ratio of the transmission 2.

As already explained, in the regulator 5 the control parameter Y for the starting clutch 4 is determined on the basis of the deviation ΔX between the actual value $X_{IST}$ of the position of the starting clutch 4 and the target value $X_{SOLL}$ for the position of the starting clutch 4.

According to the invention, in the regulator 5 the control parameter Y for the starting clutch 4 is determined not solely on the basis of this relative deviation ΔX, but rather, additionally on the basis of the absolute actual value $X_{IST}$ of the position of the starting clutch 4. As the control parameter Y for adjusting the starting clutch 4, an adjustment speed is preferably used.

When the absolute actual value of the position of the starting clutch 4 is close to a fully opened starting clutch, with the same relative deviation ΔX for coasting and thus a starting clutch which is to be opened farther a lower adjustment speed is determined than for rolling and thus a starting clutch which is to be closed farther. On the other hand, if the absolute actual value $X_{IST}$ of the position of the starting clutch 4 is close to a fully closed starting clutch, then with the same deviation ΔX for rolling and thus a starting clutch which is to be closed farther, a lower adjustment speed is determined than for coasting and thus a starting clutch 4 which is to be opened farther. This too allows the driving comfort to be increased.

In another advantageous further development it can be provided that if the actual value $X_{IST}$ of the position of the starting clutch 4 cannot be determined by measurement, a change is made from the above-described regulation of the position of the starting clutch 4 on the basis of the characteristic curves to a time-controlled operation that depends on speed thresholds. In this case two speed thresholds S1 and S2 are preferably used, of which the speed threshold S1 is higher than the speed threshold S2. In the case when the actual value $X_{IST}$ of the position of the starting clutch 4 cannot be determined by measurement, if the transmission input speed $n_{GE}$ during rolling in thrust operation exceeds the higher speed threshold S1, then the starting clutch 4 is preferably brought to the closed condition for a specified time by controlling the valves provided for actuating the starting clutch.

In contrast, if in this case the transmission input speed $n_{GE}$ during coasting falls below the lower speed threshold S2, then the starting clutch 4 is also changed to the open condition in a time-controlled manner, namely again by controlling the corresponding valves for a predefined time.

INDEXES

1 Drive aggregate
2 Transmission
3 Drive output
4 Starting clutch
5 Regulator
6 Target value generator
7 Characteristic curve
8 Characteristic curve

The invention claimed is:

1. A method of operating a drive-train in which the drive-train comprises a drive aggregate, a transmission and a starting clutch connected between the drive aggregate and the transmission, the method comprising the steps of:
    operating the drive-train during rolling in a thrust operation and during coasting in a thrust operation at a speed in which the drive-train is prone to oscillation which leads to a resonance effect of the drive-train, and determining a utilized target value for a position of the starting clutch as a function of a transmission input speed;
    comparing the utilized target value for the position of the starting clutch with a corresponding actual value of the position of the starting clutch;
    generating, in a regulator, a control parameter, for adjusting a degree of engagement of the starting clutch, on a basis of a deviation between the utilized target value for the position of the starting clutch and the actual value of the position of the starting clutch;
    for a given value of the transmission input speed, determining a rolling target value for the position of the starting clutch during rolling in the thrust operation and also determining a coasting target value for the position of the starting clutch for coasting in the thrust operation in such manner that the rolling target value determined for the position of the starting clutch during rolling is different from the coasting target value determined for the position of the starting clutch during coasting; and
    selecting the rolling target value as the utilized target value for the position of the starting clutch during rolling, and selecting the coasting target value as the utilized target value for the position of the starting clutch during coasting.

2. The method according to claim 1, further comprising the step of determining the respective rolling and the coasting target values for the position of the starting clutch for rolling and for coasting on a basis of one of separate characteristic curves and performance curves.

3. The method according to claim 1, further comprising the step of, for rolling, for each gear there is at least one characteristic curve on a basis of which, as a function of the transmission input speed, a rolling target value is determined during rolling for the position of the starting clutch which is to be engaged further.

4. The method according to claim 1, further comprising the step of, for coasting, for each gear there is at least one characteristic curve on the basis of which, as a function of the transmission input speed, a coasting target value is determined during coasting for the position of the starting clutch which is to be disengaged further.

5. The method according to claim 1, further comprising the step of determining the transmission input speed by measurement means and using the measured transmission input speed as an input magnitude for determining the rolling and the coasting target values for the position of the starting clutch for rolling and for coasting.

6. The method according to claim 1, further comprising the step of calculating the transmission input speed from a measured transmission output speed and the calculated transmission input speed as an input magnitude for determining the rolling and the coasting target values for the position of the starting clutch for rolling and for coasting.

* * * * *